US007913394B2

(12) United States Patent
Hager

(10) Patent No.: US 7,913,394 B2
(45) Date of Patent: Mar. 29, 2011

(54) CABLE SHEATH SPLITTER

(76) Inventor: Gregory L. Hager, Nebraska City, NE (US)

(*) Notice: Subject to any disclaimer, the term of this patent is extended or adjusted under 35 U.S.C. 154(b) by 172 days.

(21) Appl. No.: 12/385,617

(22) Filed: Apr. 14, 2009

(65) Prior Publication Data
US 2009/0255125 A1  Oct. 15, 2009

Related U.S. Application Data

(60) Provisional application No. 61/071,160, filed on Apr. 15, 2008.

(51) Int. Cl.
*H02G 1/12* (2006.01)
(52) U.S. Cl. .................... 30/90.7; 30/90.1; 30/90.4
(58) Field of Classification Search .............. 30/90.1, 30/90.4, 90.6, 90.7, 90.8, 90.9, 91.1, 91.2; 81/9.4, 9.51
See application file for complete search history.

(56) References Cited

U.S. PATENT DOCUMENTS

| 520,818 | A | | 6/1894 | Bettinger | |
|---|---|---|---|---|---|
| 1,275,225 | A | * | 8/1918 | Cleve | 30/90.1 |
| 2,363,758 | A | * | 11/1944 | Thompson | 30/91.1 |
| 2,380,725 | A | * | 7/1945 | Crowder | 30/91.1 |
| 2,385,368 | A | * | 9/1945 | Montgomery | 30/90.7 |
| 3,169,315 | A | | 2/1965 | Mankovitz | |
| 3,579,825 | A | * | 5/1971 | Powell | 30/90.7 |
| 3,777,397 | A | * | 12/1973 | Johnson | 30/90.6 |
| 3,796,115 | A | | 3/1974 | Dane | |
| 3,881,249 | A | * | 5/1975 | Cox, Jr. | 30/90.7 |
| 3,898,733 | A | | 8/1975 | Cormier | |
| 3,914,864 | A | | 10/1975 | Prince | |
| 3,946,487 | A | * | 3/1976 | Bieganski | 30/90.7 |
| 4,300,287 | A | | 11/1981 | Tibbs | |
| 4,459,745 | A | | 7/1984 | Britton | |
| 4,472,877 | A | * | 9/1984 | Undin et al. | 30/90.7 |
| 4,507,867 | A | | 4/1985 | Haas, Jr. | |
| 4,667,406 | A | | 5/1987 | Krampe | |
| 4,897,920 | A | | 2/1990 | Dunbar | |
| 4,955,137 | A | | 9/1990 | Matthews | |
| 5,142,780 | A | | 9/1992 | Brewer | |

(Continued)

FOREIGN PATENT DOCUMENTS
JP          5-177064          7/1993

OTHER PUBLICATIONS

Wire Strippers, 6 pages printed from the Internet—Dec. 6, 2007, http://ideal.datacomtools.com/idealcatalog/wire-strippers.htm.

*Primary Examiner* — Hwei-Siu C Payer
(74) *Attorney, Agent, or Firm* — Richard C. Litman

(57) ABSTRACT

The cable sheath splitter has an elongate body forming a lower portion handgrip and an upper portion tool structure. An end cap is rotatably attached to lower end of the handgrip. An elongate arcuate hand guard member extends from an edge of the end cap. A cutting blade is depth adjustable and extends laterally from the tool structure. A pair of rollers disposed in the tool structure outwardly extend from the structure on opposite sides of the blade. A pair of adjustable cable guide arms forms a claw that extends from the tool structure. The claw is rotatable and may also have at least two rotatably lockable positions. The claw when configured according to either of the rotatably lockable arm positions, guides the cable along a path that contacts the blade to cut the cable sheath.

5 Claims, 3 Drawing Sheets

U.S. PATENT DOCUMENTS

| | | | | |
|---|---|---|---|---|
| 5,265,338 A * | 11/1993 | Cheng | | 30/90.1 |
| 5,653,027 A * | 8/1997 | Wall | | 30/90.8 |
| 6,073,349 A * | 6/2000 | Liversidge | | 30/90.7 |
| 6,334,253 B1 * | 1/2002 | Cheng | | 30/90.7 |
| 6,463,654 B1 | 10/2002 | Moore | | |
| D505,056 S | 5/2005 | Tarpill et al. | | |
| 6,910,275 B2 * | 6/2005 | Tapper | | 30/90.1 |
| 7,124,464 B2 | 10/2006 | Williams et al. | | |

\* cited by examiner

CABLE SHEATH SPLITTER

CROSS-REFERENCE TO RELATED APPLICATION

This application claims the benefit of U.S. Provisional Patent Application Ser. No. 61/071,160, filed Apr. 15, 2008.

BACKGROUND OF THE INVENTION

1. Field of the Invention

The present invention relates to hand tools for electricians and electronics technicians, and particularly to a cable sheath splitter for splitting the outside sheath of an electrical cable.

2. Description of the Related Art

There are many types of tools designed to cut the outside sheath of a cable. These tools typically comprise cable splitters, slitters, shears and sidecutters, which technicians attempt to use for cutting the outside sheath of a cable. A drawback of using shears, sidecutters, or other existing sheath splitting tools is that the technician must be extremely careful not to strip the wiring or optical fibers encapsulated by the cable sheath. There is a need for an adjustable tool that can be configured to cut the sheath while sparing the encapsulated wiring or fibers.

Thus, a cable sheath splitter solving the aforementioned problems is desired.

SUMMARY OF THE INVENTION

The cable sheath splitter comprises an elongate body forming a lower portion handgrip and an upper portion tool structure. An end cap is rotatably attached to the lower end of the handgrip. An elongate arcuate hand guard member extends from an edge of the end cap. A cutting blade is depth adjustable and extends laterally from the tool structure. Two rollers disposed in the tool structure outwardly extend from the structure on opposite sides of the blade. A pair of cable guide arms forms a rotatable claw that extends from the tool structure. The claw may have at least two rotatably lockable positions.

The claw, when configured according to either of the rotatably lockable arm positions, guides the cable along a path that comes in contact with the blade to cut the cable sheath.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
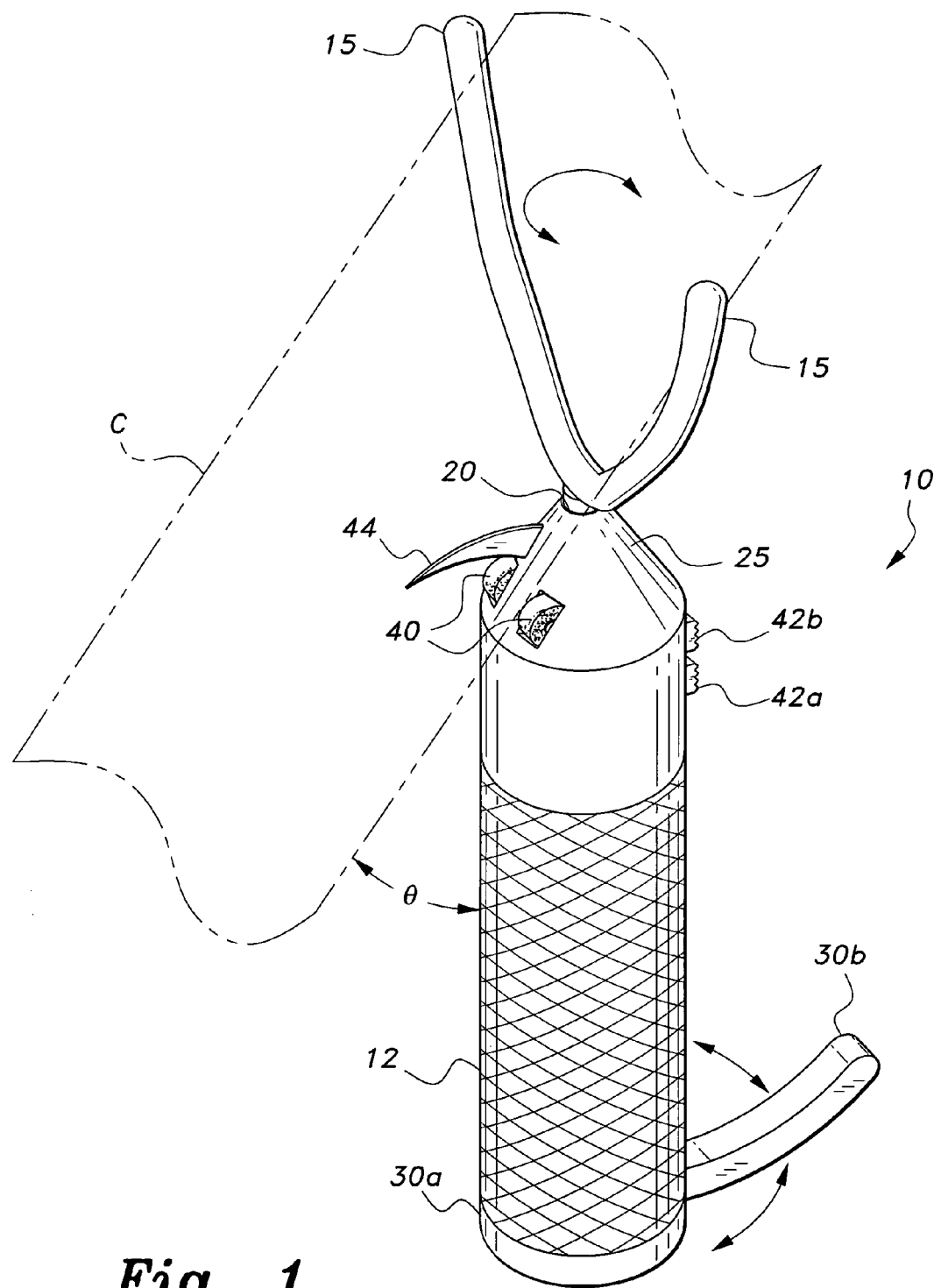
FIG. 1 is a perspective view showing a cable sheath splitter according to the present invention configured to split the cable sheath axially.

Referring to FIGS. 1-4, the present invention relates to a cable sheath splitter 10 that provides a handheld tool having an adjustable cutting blade 44. Two adjustable cable guide arms form a claw 15 that extends through aperture 20 at the top of frustoconical upper portion 25 of tool 10. The claw 15 is rotatable about the longitudinal axis of the tool body 12 and, preferably, can be locked at two different positions of rotation that are 90° apart. Thumb selector 42b is mechanically linked to the claw 15 to provide a variable adjustment of the arms of the claw 15 towards and away from each other between a fully closed position and a fully open position. The claw adjustment provides the claw 15 with the capability to envelop and form a cable pathway at a desired angle from the tool body 12. U.S. Pat. No. 7,124,464, which is hereby incorporated by reference herein in its entirety, describes an exemplary claw adjustment mechanism that may be adapted for use in the cable sheath splitter 10.

Blade 44 is mechanically connected by a lever, gear train, or the like to thumb button 42a so that movement of thumb button 42a adjusts the blade 44 to extend very slightly into the pathway of cable C, enough so that the blade 44 can strip cable C when the cable C is pulled through claw 15. U.S. Pat. No. 4,897,920, which is incorporated by reference herein in its entirety, describes an exemplary blade control mechanism that may be adapted for use in the cable sheath splitter 10. Preferably, the axial cutting pathway of cable C positions the cable C so that the cable C is at an angle θ of between 45°-60° to the tool body 12. The tool body 12 may be cylindrical and may have a knurled handgrip portion. A hand guard, which has an arcuate elongate member 30b extending from the circumferential edge of end cap 30a, is rotatably attached to the lower end of the tool body 12. Cable rollers 40 are disposed on frustoconical upper portion 25 of tool body 12 on opposite sides of blade 44.

Figure 2:
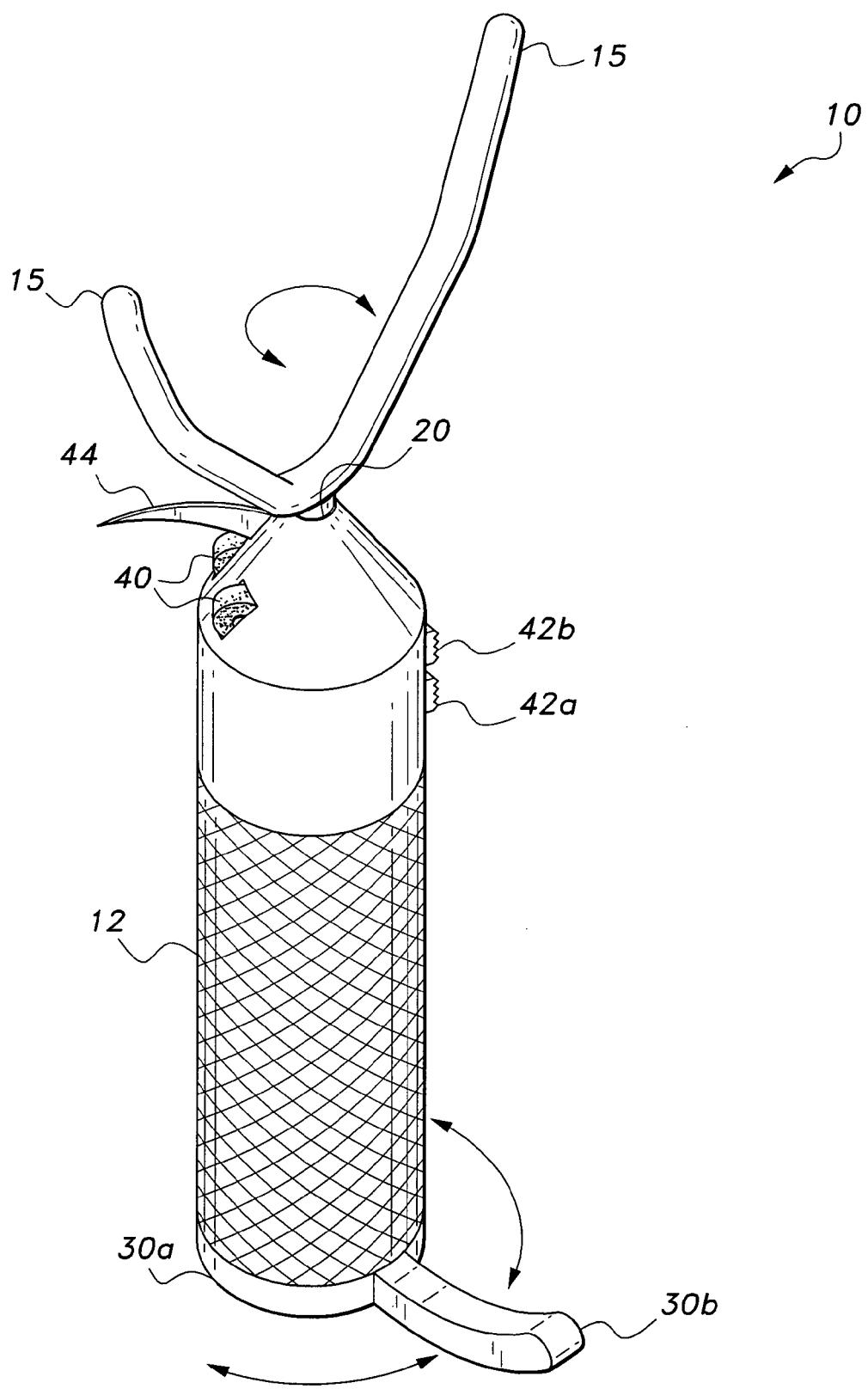
FIG. 2 is a perspective view of the cable sheath splitter according to the present invention, showing the splitter configured to split the cable sheath transversely.
Figure 3:
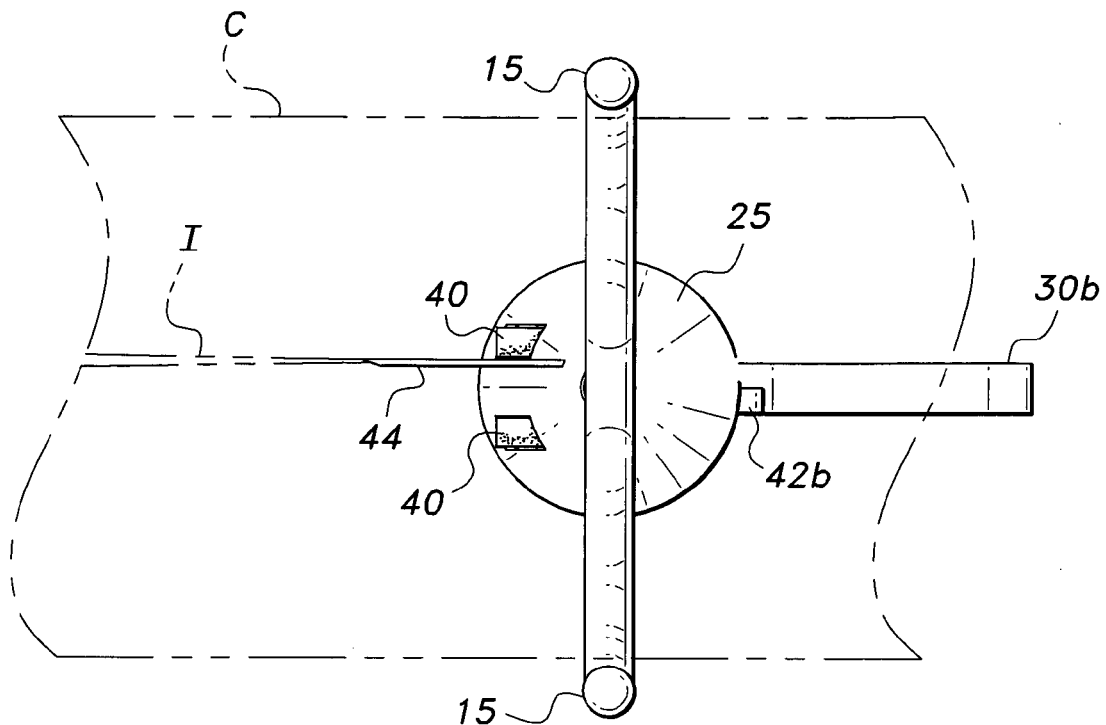
FIG. 3 is a plan view of the cable sheath splitter according to the present invention, shown in the axial splitting configuration of FIG. 1.
Figure 4:
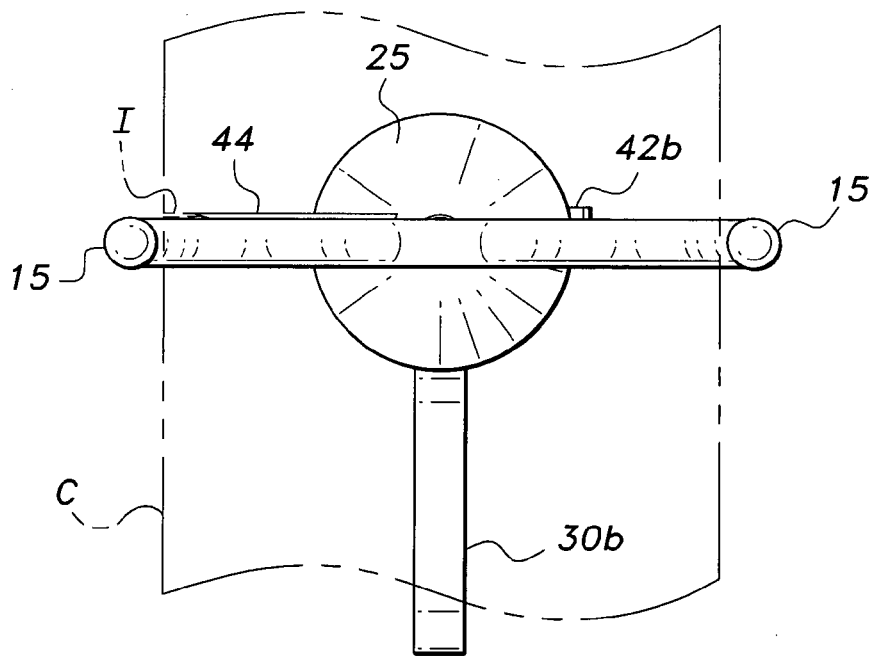
FIG. 4 is a plan view of the cable sheath splitter according to the present invention, shown in the transverse cutting configuration of FIG. 2.

As shown in FIGS. 1 and 3, a first rotatably locked position of claw 15 permits a user to make an incision I into cable C that is axial. As shown in FIGS. 2 and 4, a second rotatably locked position of the claw 15 permits a user to make an incision I into cable C that is circumferential, the cable C being rotated 360° or the splitter 10 being rotated 360° around the cable C to split or cut the cable sheath transversely entirely around the circumference of the cable C. Preferably, the rotatably locked positions of the claw 15 are 90° apart.

It is to be understood that the present invention is not limited to the embodiment described above, but encompasses any and all embodiments within the scope of the following claims.

I claim:

1. A cable sheath splitter, comprising:
    an elongate body having a lower portion forming a handgrip and an upper portion defining a cable-splitting end of the elongate body, the upper portion including a frustoconical end portion defining an aperture;
    an end cap rotatably attached to the handgrip, the end cap including an elongate arcuate hand guard member extending from the end cap;
    an adjustable depth cutting blade extending laterally from the cable-splitting end of the elongate body;
    a pair of rollers disposed in the frustoconical end portion of the elongate body, the rollers extending outward on opposite sides of the blade;
    a pair of elongate, substantially arcuate cable guide members forming a claw, the claw extending from the aperture in the frustoconical portion, the claw being adjustable to a diameter size of a cable for guiding the cable into a path so that the sheath of the cable is cut by the blade without nicking wires encased in the cable sheath.

2. The cable sheath splitter according to claim 1, wherein the depth cutting blade is arcuate.

3. The cable sheath splitter according to claim 1, wherein the claw is rotatable about a longitudinal axis of the elongate body.

4. The cable sheath splitter according to claim 1, wherein the pair of rollers and the blade are disposed on the frusto-conical portion of the cable-splitting end of the elongate body.

5. The cable sheath splitter according to claim 3, wherein said claw is rotatable into first and second locked positions, the locked positions being spaced apart by about 90°.

* * * * *